Feb. 6, 1934.  E. ROIRANT  1,946,411
APPARATUS FOR BLOWING BOTTLES AND OTHER
SIMILAR HOLLOW BODIES MADE OF GLASS
Filed Nov. 17, 1928

INVENTOR
Emile Roirant
ATTORNEY

Patented Feb. 6, 1934

1,946,411

UNITED STATES PATENT OFFICE 1,946,411

APPARATUS FOR BLOWING BOTTLES AND OTHER SIMILAR HOLLOW BODIES MADE OF GLASS

Emile Roirant, Paris, France, assignor to Société Anonyme d' Etudes et de Constructions d' Appareils Mecaniques pour la Verrerie, Paris, France Application November 17, 1928, Serial No. 320,185, and in Germany November 18, 1927

3 Claims. (Cl. 49—68)

The present invention has for its object a new apparatus for blowing bottles or other similar objects made of glass; this apparatus eliminates the inconveniences resulting from the method of blowing actually employed in machines which manufacture these kinds of objects.

The blowing of bottles or other similar objects of hollow glass is generally effected by the action of compressed air entering a bell in the upper part of the parison. It is also known to blow bottles by exerting suction around the exterior of the mould.

The object of the present invention consists in a finishing mould to be used in the suction process to which reference will be made hereinafter. By virtue of this perfected mould the mark left by the mould on the blown articles is reduced to a minimum; moreover, all the air contained in the mould is drawn out, which permits of a reduction of the cooling time of the glass inside the mould. Finally this finishing mould permits the production of bottles and other similar articles of hollow glass of a high quality.

According to the present invention the perfected finishing mould is provided with grooves on the contact faces of the chills forming the mould. When the chills are in position for moulding the grooves form channels which communicate with the interior of the mould by the joints existing between the chills and they communicate also with the conduits formed in the lower part of the mould which conduits are connected to a suction apparatus.

The finishing mould is preferably provided with a circular conduit in the lower part of the chills, which conduit connects the channels formed by the grooves on the contact faces of the chills with radiating conduits provided in the lower part of the mould and connected to a vacuum apparatus.

The invention is illustrated in the annexed drawing in which:—

Figure 1:
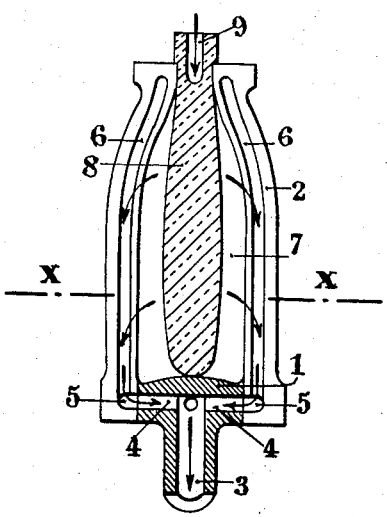
Fig. 1 shows, in axial section, a finishing mould constructed according to the present invention.
Figure 2:
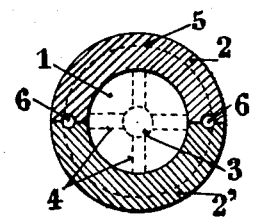
Fig. 2 is a transverse section on the line $x$—$x$ of Fig. 1, the parison being removed.

According to the invention, the bottom 1 of the finishing mould, made of two chills 2 and 2', is provided with a conduit 3 and radiating channels 4. The contact faces of the chills 2—2' are each provided with grooves 6 which form channels when said chills 2—2' are in position for moulding. The channels formed by the grooves 6 communicate with the inner space 7 of the finishing mould 1 because of the play which in practice actually exists between the contact faces of the chills 2—2'.

A circular conduit 5 is provided in the bottom of finishing mould 1 connecting the channels formed by grooves 6 and communicating with radiating channels 4.

The parison 8 is enclosed in the finishing mould and it rests by its ring upon the upper part of this mould.

The conduit 3 is connected, at the desired moment, with a suction apparatus; all the air contained in the interior of the shells being drawn out, atmospheric air flows into the upper opening 9 of the parison and inflates this latter by an action which is identical to that of compressed air in known machines.

During the blowing operation, the chills 2, 2 are, of course brought together with the bottom of the finishing mould 1 between their lower opposed contact faces, and when the air is exhausted from the interior of the chills through the conduits 3 and 4 and the channels or vacuum grooves 5 and 6, the atmospheric pressure upon the exterior area of the chills will be very considerable and serves to clamp the same together and upon the mould bottom. There are no other means for clamping the chills together during operation than the interior vacuum and external atmospheric pressure, for the chills are, of course at all times exposed to the air. Naturally, means not shown may be used to handle the chills, for they are very warm in use.

Having now fully described my invention, I claim:

1. A finishing mould for blowing hollow articles of glass, wherein the blowing of a parison is accomplished by means of a vacuum produced between said parison and the interior walls of said finishing mould, including the combination, with a finishing mould bottom, of corresponding closable chills adapted to be assembled together so as to form a complete mould having an aperture in communication with the atmosphere adapted to surround the neck of the glass blank, said chills being arranged to be retained in closed relation and clamped upon said mould bottom during the blowing operation by the external atmospheric pressure exerted upon said chills together with the vacuum produced within the same, vacuum grooves arranged in the corresponding opposed contact faces of said chills and said finishing mould bottom, intermediate the interior and exterior walls thereof and in the corresponding opposed contact faces of said chills and finishing mould bottom which serve to clamp said bottom when the mould is closed, and a relatively tight air sealing joint upon all the opposed contact faces of said chills and finishing mould bottom disposed between the vacuum grooves and exterior walls thereof, the joint upon all said opposed contact faces disposed between said vacuum grooves and the interior walls of said chills serving to provide a general passage for exhausting the interior of said chills through said grooves, the exterior of said chills and mould bottom being exposed to the atmosphere at all times, and means in said finishing mould bottom communicating with said vacuum grooves and arranged to be connected to an external vacuum source.

2. A finishing mould for the manufacture of hollow glass articles which comprises at least two solid chills having continuous inner walls adapted to be assembled together in close fitting contact with each other so as to form a complete mould having an apperture in communication with the atmosphere adapted to surround the neck of the glass blank, the contacting faces of said chills being provided with registering shallow grooves running parallelly with the walls so as to form longitudinal channels in said walls when the mould is assembled, said chills being further provided in their bottom part with a circular groove communicating with said channels, and means for connecting said circular groove with a source of vacuum.

3. A finishing mould for the manufacture of hollow glass articles which comprises two solid chills having continuous inner walls adapted to be assembled together in close fitting contact with each other so as to form a complete mould having an aperture in communication with the atmosphere adapted to surround the neck of the glass blank, the contacting faces of said chills being provided with registering shallow grooves running parallelly with the walls so as to form longitudinal channels in said walls on either side of the mould cavity when said mould is assembled, said chills being further provided in their bottom part with a semi-circular groove so as to form an annular groove communicating with said channels when the mould is assembled, and means for connecting said annular groove with a source of vacuum.

EMILE ROIRANT.